US010772287B1

(12) United States Patent
Van Eeden et al.

(10) Patent No.: US 10,772,287 B1
(45) Date of Patent: Sep. 15, 2020

(54) PET CARE SYSTEM CONFIGURED TO PROVIDE SHELTER TO ONE OR MORE PET ANIMALS

(71) Applicants: Jacobus Sarel Van Eeden, Dallas, TX (US); Karen Van Eeden, Dallas, TX (US)

(72) Inventors: Jacobus Sarel Van Eeden, Dallas, TX (US); Karen Van Eeden, Dallas, TX (US)

( * ) Notice: Subject to any disclaimer, the term of this patent is extended or adjusted under 35 U.S.C. 154(b) by 0 days.

(21) Appl. No.: 16/506,499

(22) Filed: Jul. 9, 2019

(51) Int. Cl.
*A01K 1/01* (2006.01)
*A01K 1/03* (2006.01)

(52) U.S. Cl.
CPC ............. *A01K 1/011* (2013.01); *A01K 1/033* (2013.01)

(58) Field of Classification Search
CPC ........ A01K 1/01; A01K 1/0107; A01K 1/011; A01K 1/033; A01K 1/034
See application file for complete search history.

(56) References Cited

U.S. PATENT DOCUMENTS

| | | | |
|---|---|---|---|
| 5,511,513 A | | 4/1996 | Baron |
| 5,671,698 A | * | 9/1997 | Farrugia ............... A01K 1/0236 119/497 |
| 8,683,952 B2 | | 4/2014 | Miller |
| 9,633,540 B1 | * | 4/2017 | Teshome .............. A01K 15/023 |
| 2002/0134314 A1 | * | 9/2002 | Carlisi ................. A01K 1/0107 119/166 |
| 2006/0249088 A1 | * | 11/2006 | Eu ........................... A01K 1/033 119/51.02 |
| 2007/0193522 A1 | * | 8/2007 | Greschler ............ A01K 1/0254 119/28.5 |
| 2009/0205578 A1 | * | 8/2009 | Alves .................... A01K 1/0107 119/454 |
| 2010/0307424 A1 | * | 12/2010 | Evans .................. A01K 1/0107 119/416 |
| 2011/0315084 A1 | * | 12/2011 | Miller ..................... A01K 1/011 119/166 |
| 2012/0199080 A1 | * | 8/2012 | Siddons ................. A01K 1/033 119/448 |
| 2012/0299731 A1 | * | 11/2012 | Triener .................. G01G 17/08 340/573.1 |
| 2012/0313786 A1 | * | 12/2012 | Clary .................... A01K 1/0107 340/573.3 |

(Continued)

FOREIGN PATENT DOCUMENTS

DE           2116440 A1 * 11/1972 ............. A01K 1/034

*Primary Examiner* — Magdalena Topolski
*Assistant Examiner* — Morgan T Barlow
(74) *Attorney, Agent, or Firm* — Patent Yogi LLC; Dhiraj Jindal

(57) ABSTRACT

A litter box for sheltering one or more pets. The litter box includes a housing having a base and at least one vertical side wall (including an entry-exit opening), which may be forming a one-piece enclosure for accommodating the one or more pets. An inner surface of the one-piece enclosure may be a smooth surface including rounded edges. Further, the litter box includes a removable lid for removably attaching to at least one top edge of the at least one vertical side wall. Further, the litter box may include a detachable holder for detachably placing on an outer surface of the at least one vertical side wall, to hold at least one absorbent pad. Further, the litter box may include a removable organizer for storing a plurality of cleaning supplies.

17 Claims, 7 Drawing Sheets

(56) References Cited

U.S. PATENT DOCUMENTS

| | | | |
|---|---|---|---|
| 2014/0311414 A1* | 10/2014 | Morris | B32B 7/00 |
| | | | 119/161 |
| 2015/0143750 A1* | 5/2015 | Jalbert | E06B 7/32 |
| | | | 49/25 |
| 2016/0262356 A1* | 9/2016 | Perez-Camargo | A01K 29/005 |
| 2017/0083018 A1* | 3/2017 | Womble | A01K 27/009 |
| 2017/0097169 A1* | 4/2017 | Azevedo | A01K 1/033 |
| 2017/0188539 A1* | 7/2017 | Orgias | A01K 1/0107 |
| 2017/0251633 A1* | 9/2017 | Womble | A61B 34/10 |
| 2017/0273273 A1* | 9/2017 | Chou | A01K 1/0107 |
| 2018/0064060 A1* | 3/2018 | Romney | A01K 1/033 |
| 2019/0069510 A1* | 3/2019 | Otero | A01K 1/033 |
| 2019/0166788 A1* | 6/2019 | Xu | A01K 1/01 |
| 2019/0191662 A1* | 6/2019 | Takada | A01K 1/011 |
| 2019/0230892 A1* | 8/2019 | Chang | A01K 1/011 |

\* cited by examiner

PET CARE SYSTEM CONFIGURED TO PROVIDE SHELTER TO ONE OR MORE PET ANIMALS

TECHNICAL FIELD

Generally, the present disclosure relates to the field of animal husbandry. More specifically, the present disclosure relates to pet care system configured to provide shelter to one or more pet animals.

BACKGROUND

Litter box for pet animals requires regular cleaning. No one likes to do that, but every pet owner knows the limit of their litter box use. One may simply forget to scoop, and that may lead to some urinary issues and odor problems.

Existing litter boxes for pet animals are deficient with regard to several aspects. For instance, conventional litter boxes do not provide a seamless and/or solid one-piece design and usually have ridges around the corners or at the bottom surface. Further, the ridges on such surfaces of the conventional litter box attract the waste (such as feces and/or urine) that can easily get stuck on such uneven surfaces. Therefore, making it extremely difficult to clean the waste from the litter box. Furthermore, conventional litter boxes do not provide any organized space for storing cleaning supplies that are required frequently in order to clean the litter box.

Therefore, there is a need for improved pet care system configured to provide shelter to one or more pet animals that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a pet care system configured to provide shelter to one or more pet animals, in accordance with some embodiments. Accordingly, the pet care system may include a housing having a base and at least one vertical side wall. Further, at least one side edge of the base may be attached to at least one bottom edge of the at least one vertical side wall. Further, the base and the at least one vertical side wall of the housing may form a one-piece enclosure configured to accommodate the one or more pet animals. Further, an inner surface of the one-piece enclosure may be a smooth surface including rounded edges. Further, the at least one vertical side wall may include an entry-exit opening for the one or more pet animals. Further, the pet care system may include a removable lid configured to be removably attached to at least one top edge of the at least one vertical side wall. Further, the pet care system may include a detachable holder configured to be detachably placed on an outer surface of the at least one vertical side wall. Further, the detachable holder may be configured to hold at least one absorbent pad. Further, the pet care system may include a removable organizer configured to store a plurality of cleaning supplies. Further, the removable organizer may be removably attached to the at least one vertical side wall through an attachment means.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
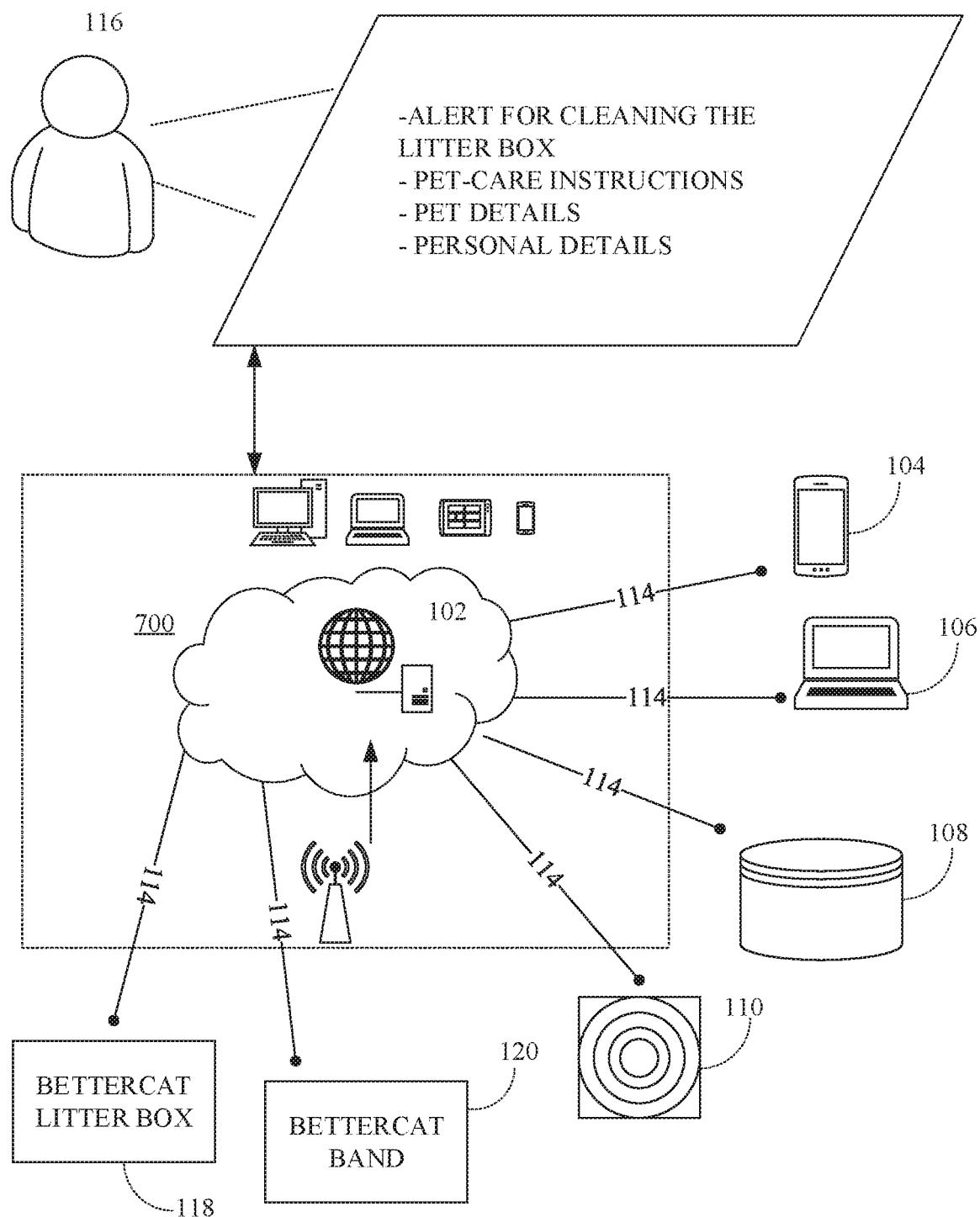
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a pet care system configured to provide shelter to one or more pet animals, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure includes a litter box (that may sometimes be referred to as a jumbo litter box, or a BetterCat litter box). Accordingly, the litter box, in an instance, may be light in color, strong plastic rectangular litter box with high sides, rounded edges with no grooves at sides or bottom, very smooth and shiny interior surface. Further, the litter box may be light in color (such as, but not limited to, white and/or light beige) so that the user may see urine and/or feces for easy cleaning. Further, the litter box may have high sides for cats that like to spray when urinate. Further, the litter box may include handles on all sides of the litter box, so that a user may easily tilt the box to all four sides. When the user tilts the box and the cat sprayed or urinated on the side, the clump should sit there. It makes it easy to scoop. When litter sand is tilted to the opposite side of the box, cleaning the urine or dirt on the side is very easy. Spray a piece of paper towel with an Oxygen or Bleach (mixed with water) solution and wipe clean, or spray directly on stubborn areas, it wipes clean easily. Further, the user may refill the box afterward with clean litter sand to the desired level when the litter sand starts to get low, and therefore don't need to change all the litter sand every two weeks. Further, the level of the litter sand should be deep enough, so that when the cat urinates, it won't touch the bottom of the litter box, and therefore form a hard clumping ball above the bottom of the box. Further, the litter box may include a holder for a roll of perforated or pack of "cat pads" aka puppy training pads, that may also be used as a stepping area for the entrance to the litter box. The higher the entrance, the less chance of urine ending up outside of the box. Simply pull out the pad from the step, and tear the pad off, or spread the pad out when a new one is needed. Further, the litter box may include a cat detection device, so that the user may be notified by way of an application, that it is time to scoop the litter box. No one likes to do that, but every pet owner knows the limit of their litter box use. One may simply forget to scoop or wait too long to clean the litter box, and that may lead to cats starting to urinate outside the litter box in the house, some urinary issues and odor problems. For instance, a regular litter box may have to be cleaned after 6 entry detections, so the user may have to be notified after 6, personalizing settings to that number. Further, a lid of the litter box should fit lightly on the box, (as the litter box is not a storage unit), and therefore should be able to be removed without any effort.

Further, the litter box (such as a jumbo cat litter box) may accommodate small to extra-large cats easily (up to 20 pounds cats). An entry opening may have a connected motion detector (LitterBox sensor) that monitors cats coming in and links to a BetterCat-App, counting how many times a cat goes in so the user knows, via notification, when the litter box needs to be cleaned. The litter box may be made from strong durable glossy plastic (one solid piece). The BetterCat LitterBox entry area or lid may also have a connected sensor. Further, underneath and in front of the cat entry opening there may be a plastic covered detachable entry piece that may be the holder of a roll or stack of pet floor pads. Such an entrance piece and pad holder may become a step for cats to get in and out. Further, a removable BetterCat-Organizer may be attached to the litter box. Further, the removable BetterCat-Organizer is for cleaning supplies including scooper, litter waste bags (a bio-degradable product), Concentrated Pet stain and odor remover (such as Fizzion with CO2). Further, The BetterCat-App may have 2 versions: base and enhanced with upgrade features. Further, the BetterCat-app may run on the BetterPet-platform. The objective is to offer a BetterPet-platform (cloud based), with APIs, bringing additional value services to cat and pet owners.

Further, follow-up products may be LitterBox Kits and a BetterPet-App that may be added to any litter-box. The BetterPet-App may be connected to the cloud based BetterPet-platform.

Further, a jumbo cat litter box that accommodates small to extra-large cats easily (up to 20 pounds). Attached to the entry opening is a connected motion detector (LitterBox sensor) that may monitor cats coming in and links to the BetterCat-App, counting how many times a cat goes in so the user may know, via notification, when the litter box needs to be cleaned. The sides of the litter box may be higher enabling large cats to comfortably move, turn and urinate inside. There may be no seams. Further, the bottom and all sides may be solid and one piece. Further, the cats, in an instance, may come in from the side in a 10 inch (high) and 9-inch-wide opening. The litter box may be made from strong durable glossy plastic (one solid piece) with a smooth inside, no seems, so cleaning is easy from the top (scooping and cleaning out cat litter). There are 4 strong and smooth handgrip openings (handles), one in the middle on every side of the litter box, so the user may easily pick the litter box up, move and tilt the litter box as the user uses it. Further, underneath and in front of the cat entry opening there is a covered detachable holder that holds a roll or pack of pet floor pads (BetterPet-Pads) that may be rolled out to cover the floor in-front of the opening for cat urine or litter scratched outside. The BetterPet-Pads may be perforated so the user may tear them off as used. Further, the top of the covered pad holder (made in strong plastic) may serve as a stepping area for the cats to get in and out the litter box.

Further, a removable BetterCat-Organizer that attach to the litter box. Further, removable BetterCat-Organizer may be used for storing cleaning supplies including scooper, litter waste bags (bio-degradable product), concentrated Pet stain and odor remover (Fizzion with CO2), etc.

Further, the BetterCat-LitterBox also has a strong removable lid so it is easy to clean the litter box from the top. Also with a connected LitterBox sensor on the litter box. Further, the LitterBox sensor notifies the BetterCat-App and user that the litter box may have been cleaned when the lid is opened or a button is pressed.

Further, tilting the litter box makes it easy to separate the litter sand from the litter to scoop and also to wipe down the insides, that helps reduce how quickly the user may need to replace the litter sand. A good quality clumping litter sand could limit replacement to once every 3 to 4 months.

Further, the BetterCat-App may have 2 versions: Basic Level and Upgrade Level with enhanced features. The objective is to become the Better Pet Care Digital platform, with APIs, bringing value services to cat owners. The base app offers tracking and notifications. The upgrade version may include more functions, commerce, user collaboration etc.

Further, a follow-up product could be LitterBox Kits and a BetterPet-App that may be added to any litter-box. The follow-up product may be connected to the cloud based BetterPet-platform.

Further, the BetterCat-App (Basic level (free)), in an instance, may include customer account module. Further, the customer account module may include Customer personal Details, Shipping and billing details, Pet names and details, Account password and security, Litterbox connect, setup and location, Communication and sharing channel setup (text, email, WhatsApp etc.). Further, the BetterCat-App (Basic level) may monitor/scan how often cats come into the litter box. Further, the BetterCat-App (Basic level) may include cat box identification and location in home. Further, the BetterCat-App (Basic level) may provide notification when litter box needs to be cleaned after a set number of entries by a cat. Further, the BetterCat-App (Basic level) may provide an ability to customize settings how and when to be notified (e.g. how many times the litter box may be used by cats). Further, the litterbox lid may be connected, so when the lid may be lifted the BetterCat-App notes that the litter box was cleaned. (If used without a lid, then the litter box could have a connection that triggers a reset when box is moved or tilted). Further, the BetterCat-App (Basic level) may allow purchasing BetterCat-care products with auto scheduling. Further, the BetterCat-App (Basic level) may provide an ability connect to other apps with APIs so they can integrate complimentary services, e.g. Ability to link to pet-sitter services (finding a pet-sitter) via API, Ability to order litter, food and cleaning supplies from BetterCat-App with auto-delivery scheduling.

Further, the BetterCat-App Upgrade Version (upgrade service and maybe product) may include a customer account module. Further, the customer account module may include Customer Personal Details, Security, Secure Payment details, Shipping and billing details, Pet names and detail setup module, Account password and security, Pet-Sitter setup module, Litterbox connect, setup and location, Communication and sharing channel setup (text, email, WhatsApp etc.). Further, the BetterCat-App Upgrade Version may include a Litterbox setup (using Bluetooth and/or RFID) module, a Cat necklace (Bluetooth and/or RFID) setup and connection to Litterbox setup module. Further, the BetterCat-App Upgrade Version may allow a Pet-sitter to get notifications when to clean litter boxes. Further, the BetterCat-App Upgrade Version may provide pet-care instructions with text, photo and video (made with the application or uploaded to application) to pet-sitter with a care notes section. Further, the BetterCat-App Upgrade Version may provide care instructions that may be shared via text, email, WhatsApp etc. Further, the Pet-sitter module to add a sitter as a guest and have care start date and time and end date and time (with security). Further, the BetterCat-App Upgrade Version may provide an ability to upload cat medications, food types etc. and servicing procedures (may be shared with the pet-sitter). Further, the BetterCat-App Upgrade Version may allow buying BetterCat care products with auto scheduling ability connect to other apps with APIs so they can integrate complimentary services, e.g. ability to link to pet-sitter services (finding a pet-sitter) via API, ability to order litter, food and cleaning supplies from the app with auto-delivery scheduling. Further, the BetterCat-App Upgrade Version may allow tracking of a cat in the house or outside via Bluetooth. Further, the BetterCat-App Upgrade Version may include analytics such as Litter box use by a cat (how many times by day, which box), Cat locations, Customer Analytics.

Further, a BetterCat-Band provides an added ability to have cats connected with a Bluetooth and/or RFID sensor enabled collar, so the user may know which cat goes to which litter box with the count. Further, the user may track the cat in the house. Further, the user may track sleep patterns associated with the cat.

FIG. 1 is an illustration of an online platform 100 consistent with various embodiments of the present disclosure. By way of non-limiting example, the online platform 100 to facilitate data processing may be hosted on a centralized server 102, such as, for example, a cloud computing service. The centralized server 102 may communicate with other network entities, such as, for example, a mobile device 104 (such as a smartphone, a laptop, a tablet computer etc.), other electronic devices 106 (such as desktop computers, server computers etc.), databases 108, BetterCat litter Box 118, BetterCat Band 120, and sensors 110 over a communication network 114, such as, but not limited to, the Internet. Further, users of the online platform 100 may include relevant parties such as, but not limited to, end users, administrators, service providers, service consumers and so on. Accordingly, in some instances, electronic devices operated by the one or more relevant parties may be in communication with the platform.

A user 116, such as the one or more relevant parties, may access online platform 100 through a web based software application or browser. The web based software application may be embodied as, for example, but not be limited to, a website, a web application, a desktop application, and a mobile application compatible with a computing device 700.

Figure 2:
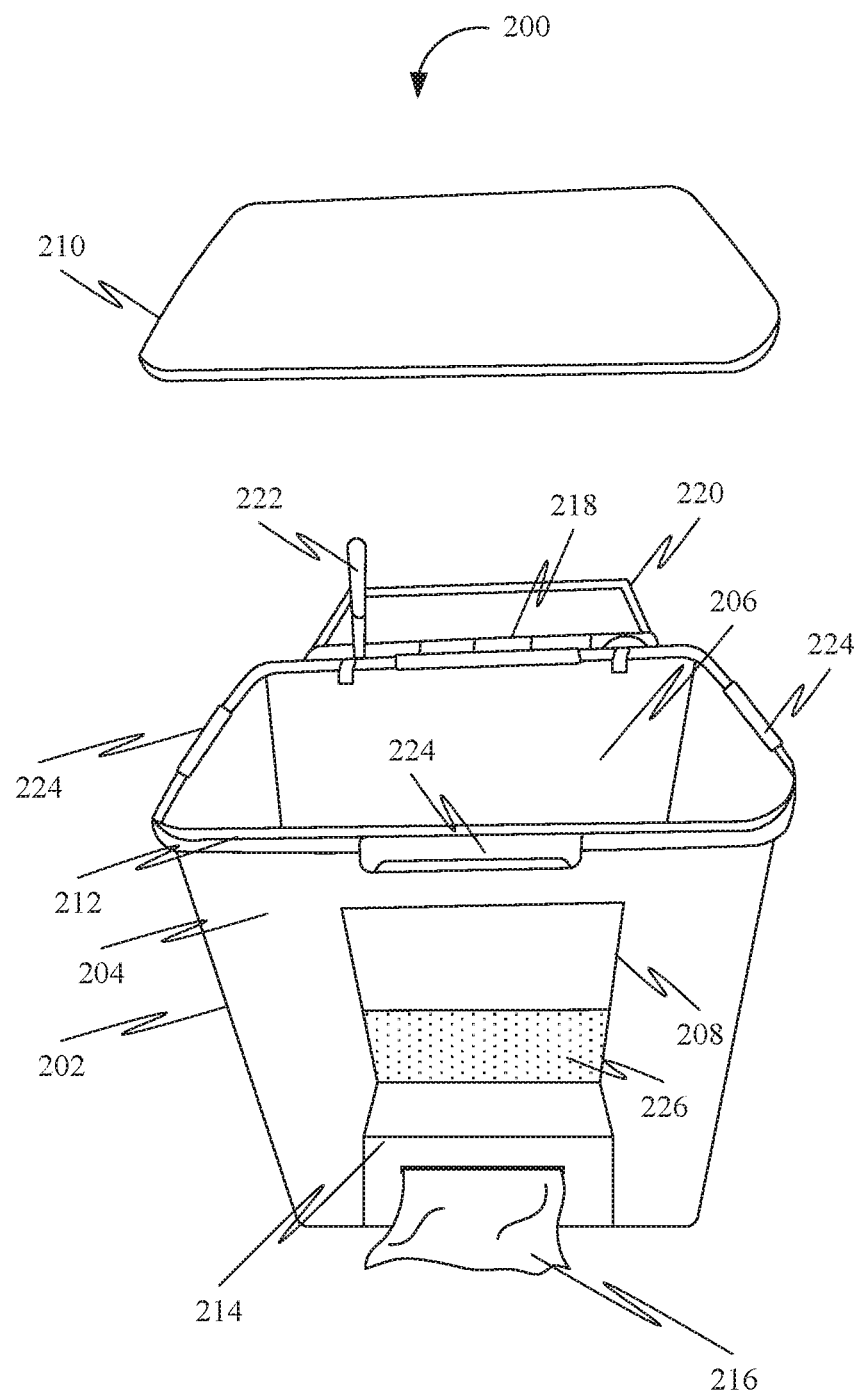
FIG. 2 is an exemplary representation of a pet care system configured to provide shelter to one or more pet animals, in accordance with some embodiments.
Figure 6:
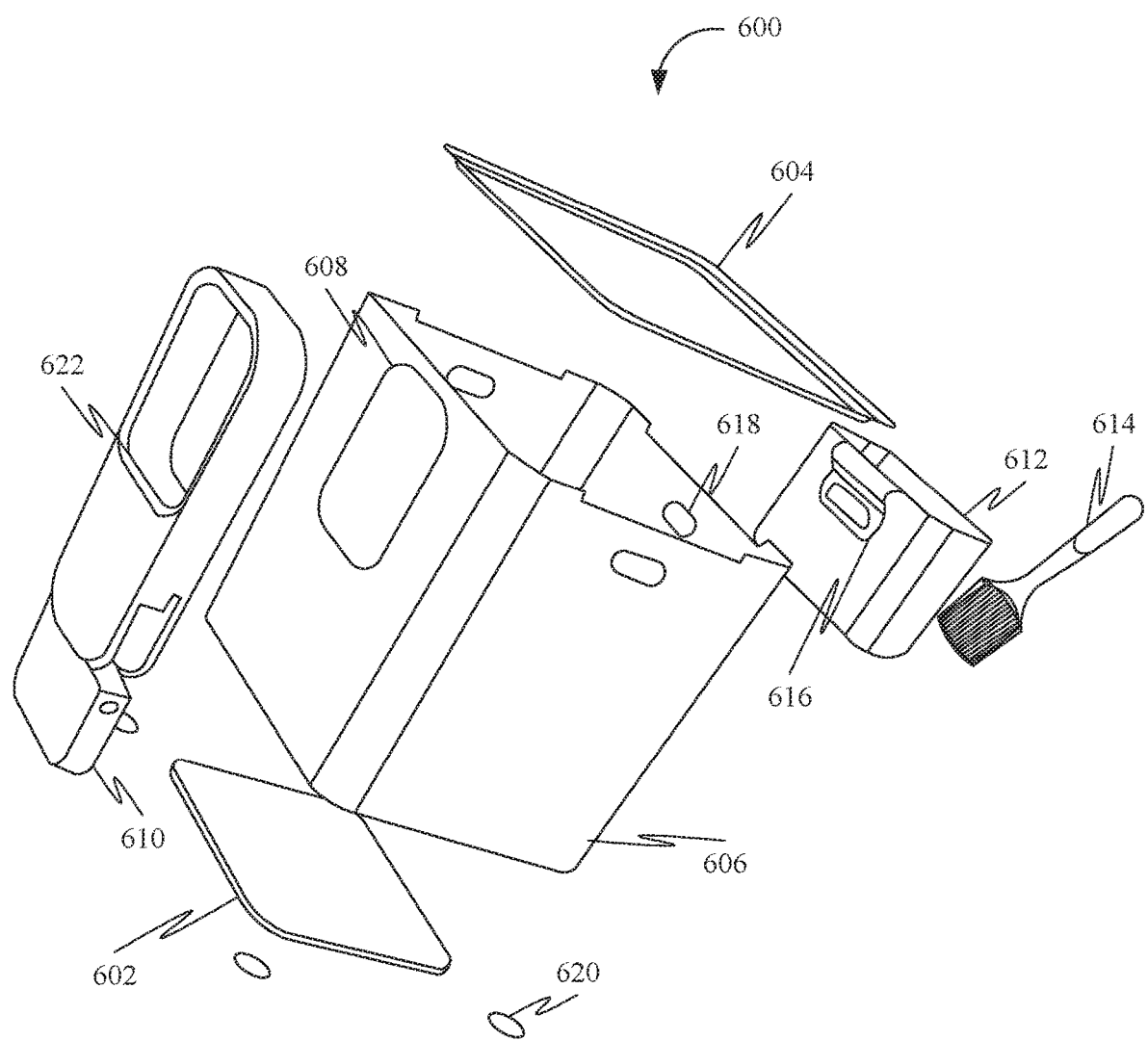
FIG. 6 is an exploded perspective view of a pet care system configured to provide shelter to one or more pet animals, in accordance with some embodiments.

FIG. 2 is an exemplary representation of a pet care system 200 configured to provide shelter to one or more pet animals, in accordance with some embodiments. Accordingly, the pet care system 200 may include a housing 202 having a base (for e.g. a rectangular base 602 as shown in FIG. 6) and at least one vertical side wall 204. Further, at least one side edge of the base may be attached to at least one bottom edge of the at least one vertical side wall 204. Further, the base and the at least one vertical side wall 204 of the housing 202 may form a one-piece enclosure configured to accommodate the one or more pet animals. Further, an inner surface 206 of the one-piece enclosure may be a smooth surface including rounded edges. Further, the at least one vertical side wall 204 may include an entry-exit opening 208 for the one or more pet animals.

Further, the pet care system 200 may include a removable lid 210 configured to be removably attached to at least one top edge 212 of the at least one vertical side wall 204.

Further, the pet care system 200 may include a detachable holder 214 configured to be detachably placed on an outer surface of the at least one vertical side wall 204. Further, the detachable holder 214 may be configured to hold at least one absorbent pad 216. Further, in some embodiments, the detachable holder 214 may be configured to be detachably placed on the outer surface below the entry-exit opening 208. Further, the detachable holder 214 may function as a stepping area for the one or more pet animals. Further, in some embodiments, the at least one absorbent pad 216 may include pet floor pad configured to be rolled out from the detachable holder 214 to cover a floor in-front of the entry-exit opening 208.

Further, the pet care system 200 may include a removable organizer 218 configured to store a plurality of cleaning supplies. Further, the removable organizer 218 may be removably attached to the at least one vertical side wall 204 through an attachment means. Further, in some embodiments, the attachment means may include at least one of hooks, Velcro fasteners, and magnetic fasteners.

Further, in some embodiments, the pet care system 200 may include at least one sensor device attached to at least one portion of at least one of the housing 202, the detachable holder 214, the removable lid 210, and the removable organizer 218. Further, the at least one sensor device may be configured to generate at least one sensor data. Further, in some embodiments, a wireless transceiver may be attached to at least one portion of at least one of the housing 202, the detachable holder 214, the removable lid 210, and the removable organizer 218. Further, the wireless transceiver may be communicatively coupled with the at least one sensor device. Further, the wireless transceiver may be configured to transmit an alert notification to at least one user device based on the at least one sensor data.

Further, in some embodiments, the at least one user device may be operated by at least one of an owner associated with the one or more pet animals, a pet-sitter, and a veterinarian.

Further, in some embodiments, the alert notification may include at least one of an email, an SMS, a voice call, a voicemail, and an audible alert. Further, the alert notification may be in at least one of a textual form, an audio form, and an audiovisual form. Further, in some embodiments, the alert notification may include a prompt to clean the housing 202 of the pet care system 200. Further, in some embodiments, the alert notification may include behavior analytics associated with the one or more pet animals.

Further, in some embodiments, the at least one sensor device may include a motion sensor. Further, the motion sensor may be configured to detect entry and exit events of the one or more pet animals through the entry-exit opening 208. Further, in some embodiments, the motion sensor may be embedded on the at least one vertical side wall 204 near the entry-exit opening 208 of the housing 202.

Further, in some embodiments, the at least one sensor device may include a Bluetooth and Radio-Frequency Identification (RFID) detector configured to scan a Bluetooth and RFID band associated with a pet animal to determine an identity of a pet animal in the one or more pet animals. Further, the Bluetooth and RFID band may include at least one of a Bluetooth based collar and an RFID-based collar worn by the pet animal. Further, in some embodiments, the Bluetooth and RFID detector may be embedded on the at least one vertical side wall 204 near the entry-exit opening 208 of the housing 202.

Further, in some embodiments, the at least one sensor device may include a proximity sensor configured to detect opening and closing events of the removable lid 210. Further, in some embodiments, the proximity sensor may be embedded on at least one of the removable lid 210, and the at least one vertical side wall 204 of the housing 202.

Further, in some embodiments, the removable organizer 218 may include at least one holding handle 220. Further, the at least one holding handle 220 may be used to hold the removable organizer 218 in hand while cleaning the housing 202 (for e.g. while tilting the housing 202 for cleaning).

Further, in some embodiments, the removable organizer 218 may include a plurality of compartments. Further, the plurality of compartments may be configured to segregate at least one cleaning supply from the plurality of cleaning supplies. Further, in some embodiments, the plurality of cleaning supplies may include at least one of scoopers (such as a scooper 222), litter waste bags, sprayers, brushes, and absorbent pads.

Further, in some embodiments, the at least one vertical side wall 204 of the housing 202 may include at least one handle (such as handle 224) near the at least one top edge 212 of the at least one vertical side wall 204.

Further, in some embodiments, the scooper 222 may be having a deep shovel section. Further, the deep shovel section may include a plurality of long and narrow grooves. Further, the plurality of long and narrow grooves may be configured to scoop out small sized clumps of animal waste from a litter sand (such as litter sand 226 that may be present inside the housing 202).

Figure 3:
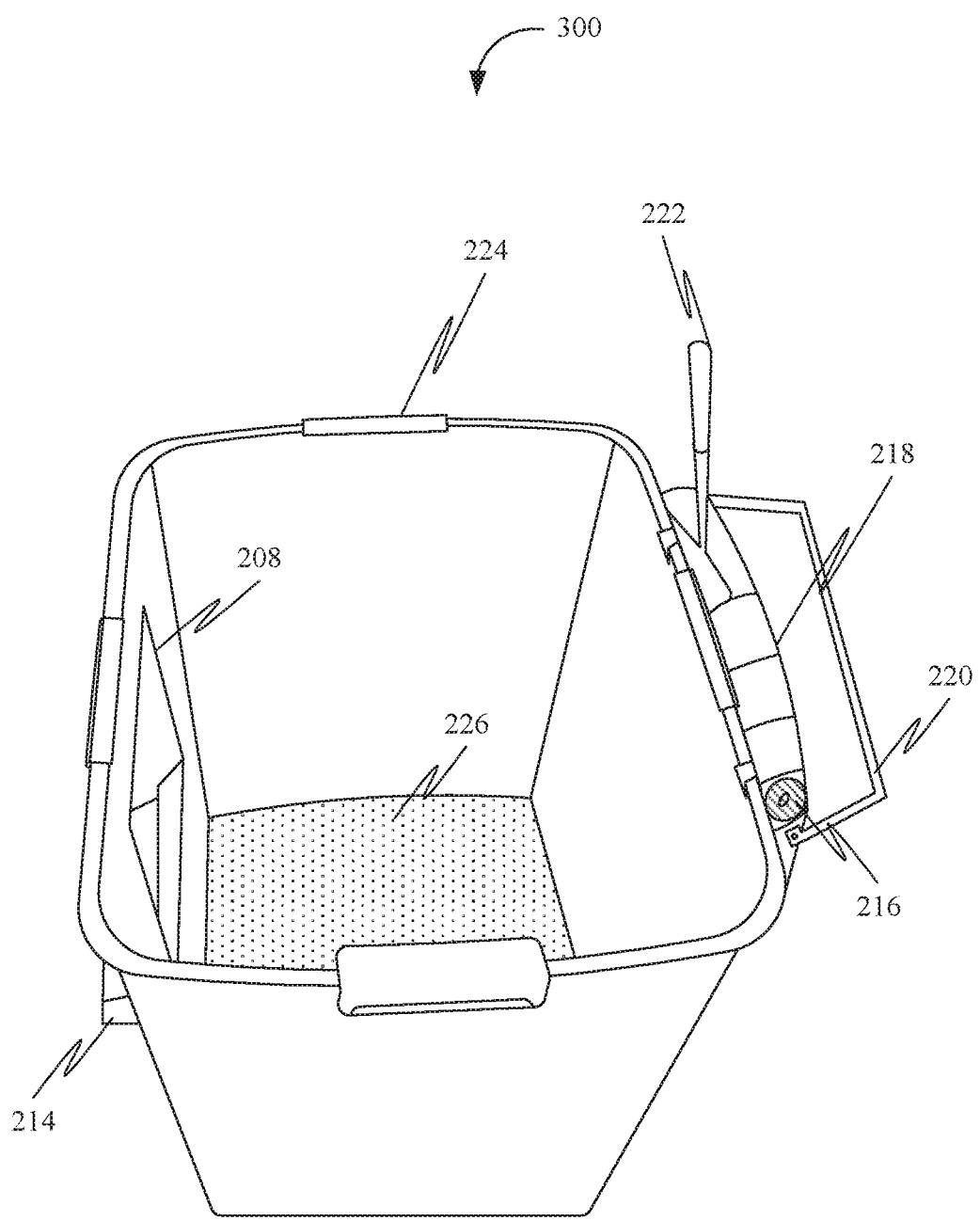
FIG. 3 is a top perspective view of a BetterCat litter box configured to provide shelter to one or more pet animals, in accordance with some embodiments.

FIG. 3 is a top perspective view of a BetterCat litter box 300 configured to provide shelter to one or more pet animals, in accordance with some embodiments. Accordingly, the BetterCat litter box 300, in an instance, may be an IoT based rectangular litter box that may be configured to collect feces and/or urine from pet animals such as (but not limited to) cats, rabbits, ferrets, miniature pigs, small dogs, and/or other pets. Further, the BetterCat litter box 300, in an instance, may be in a cuboid shape with six surfaces such as four side surfaces (such as a vertical side wall of the at least one vertical side wall 204), one bottom surface (such as the base), and one roof surface (i.e. the removable lid 210 as shown in FIG. 2). Further, the bottom surface and all four side surfaces of the BetterCat litter box 300, in an instance, may be solid and/or one piece with rounded edges and no seams and/or ridges. Further, the four side surfaces of the BetterCat litter box 300, in an instance, may be designed with a tall height enabling large size pet animals (such as large cats) to comfortably move, turn and urinate inside the BetterCat litter box 300. For instance, tall side surfaces of the BetterCat litter box 300 may prevent any urine and/or feces to be sprayed outside the BetterCat litter box 300 as large male cats may like to spray when urinate. Further, the removable lid, in an instance, may be configured to be removed easily by a user whenever required. For instance, the user may remove the removable lid while cleaning the BetterCat litter box 300 from top (e.g. scooping and cleaning out cat litter). Further, in another instance, the removable lid may be removed by the user from the BetterCat litter box 300 in order to fill (and/or refill) the BetterCat litter box 300 with litter sand (such as the litter sand 226) up to a desired level. Further, the desired level associated with the litter sand for the BetterCat litter box 300, in an instance, may be a depth level of the litter sand in the BetterCat litter box 300 such that when the cat urinates, the urine and/or feces may not touch the bottom surface of the BetterCat litter box 300 and instead may form a hard clumping ball above the bottom surface which may be easily scooped out for cleaning.

Further, the BetterCat litter box 300, in an instance, may be designed and/or manufactured from strong durable glossy plastic (one solid piece) with smooth inside surface (or shiny interior surface with no seams or ridges) allowing the user to clean the BetterCat litter box 300 easily from the top (e.g. scooping and cleaning out cat litter). Further, the user, in an instance, may be a pet owner and/or a pet-sitter that may wish to clean the BetterCat litter box 300. Further, the BetterCat litter box 300, in an instance, may be light in color (such as, but not limited to, white or light beige) so that the user may be able to see the urine and/or feces for easy cleaning. Further, the BetterCat litter box 300, in an instance, may include one or more handles (such as the handle 224) on each side of the four side surfaces (for e.g. near top boundaries) of the BetterCat litter box 300. For instance, the BetterCat litter box 300 may include four handles (in total) with one handle on each side surface of the BetterCat litter box 300 such that the user may be able to tilt (using the handle) the BetterCat litter box 300 to all the four sides for easy cleaning (e.g. scooping and cleaning out cat litter from all side directions).

Further, the BetterCat litter box 300, in an instance, may be configured to provide enough room to accommodate one or more pet animals. For instance, the BetterCat litter box 300 may be configured to accommodate small to extra-large cates easily (up to 20 pounds cats). Further, the BetterCat litter box 300, in an instance, may include an entry/exit opening (such as the entry-exit opening 208) that may allow easy entry and/or exit for the pet animal (such as a cat). For instance, a regular cat may easily enter and/or exit the BetterCat litter box 300 through the entry/exit opening having dimensions such as 10 inches (high) and 9 inches (wide). Further, the BetterCat litter box 300, in an instance, may include a covered detachable holder (such as the detachable holder 214). Further, the covered detachable holder, in an instance, may be configured to hold a role of pet floor pads (such as the absorbent pads 216, which may be referred to as BetterPet-Pads) underneath and in front of the entry/exit opening of the BetterCat litter box 300. Further, the BetterPet-Pads, in an instance, may be absorbent pads that may be rolled out from the covered detachable holder to cover a floor in-front of the entry/exit opening of the BetterCat litter box 300. Further, the floor in-front of the entry/exit opening of the BetterCat litter box 300, in an instance, may need to be covered with the BetterPet-Pads so that when the pet animal (such as a cat) may step outside the BetterCat litter box 300 through the entry/exit opening, then any impurity (such as urine, feces etc.) may get absorbed by the BetterPet-pads instead of spilling over the floor. Further, the BetterPet-Pads, in an instance, may be perforated so that the user may tear them off as used. For instance, the user may simply pull out a pad from the roll of pet floor pads of the covered detachable holder, and tear the pad off when a new one may be needed. Further, the BetterPet-Pads, in an instance, may be lightweight and may allow the user to throw litter sand back in the BetterCat litter box 300. For instance, if a cat spills the litter sand outside the BetterCat litter box 300, then the litter sand may be collected over the BetterPet-Pads that may further be thrown back into the BetterCat litter box 300. Further, in a case when the cat urinates over the BetterPet-Pads, the BetterPet-Pads may not need to be washed and/or soaped with water in order to get the smell out. In an instance, the BetterPet-Pads may include perforated cat pads (also known as puppy training pads). Further, a top of the covered detachable holder, in an instance, may be made up of strong plastic and may serve as a stepping area for the pet animals to get in and out of the BetterCat litter box 300 through the entry/exit opening that may be placed at a significant height. Further, the higher the entry/exit opening of the BetterCat litter box 300, the fewer chances of urine ending up outside of the BetterCat litter box 300.

Figure 4:
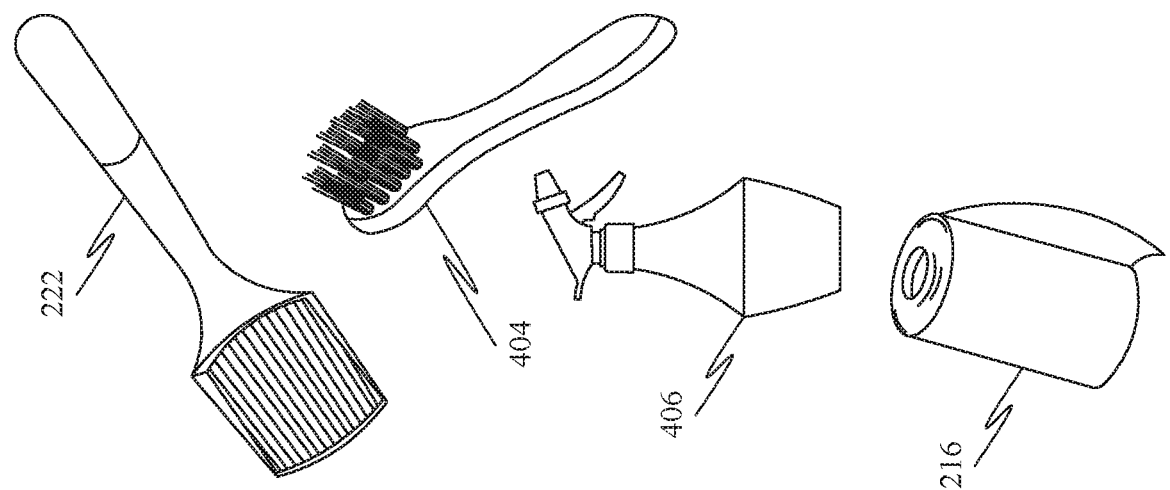
FIG. 4 is a top perspective view of a removable organizer with a plurality of cleaning supplies, in accordance with some embodiment.
Figure 4:
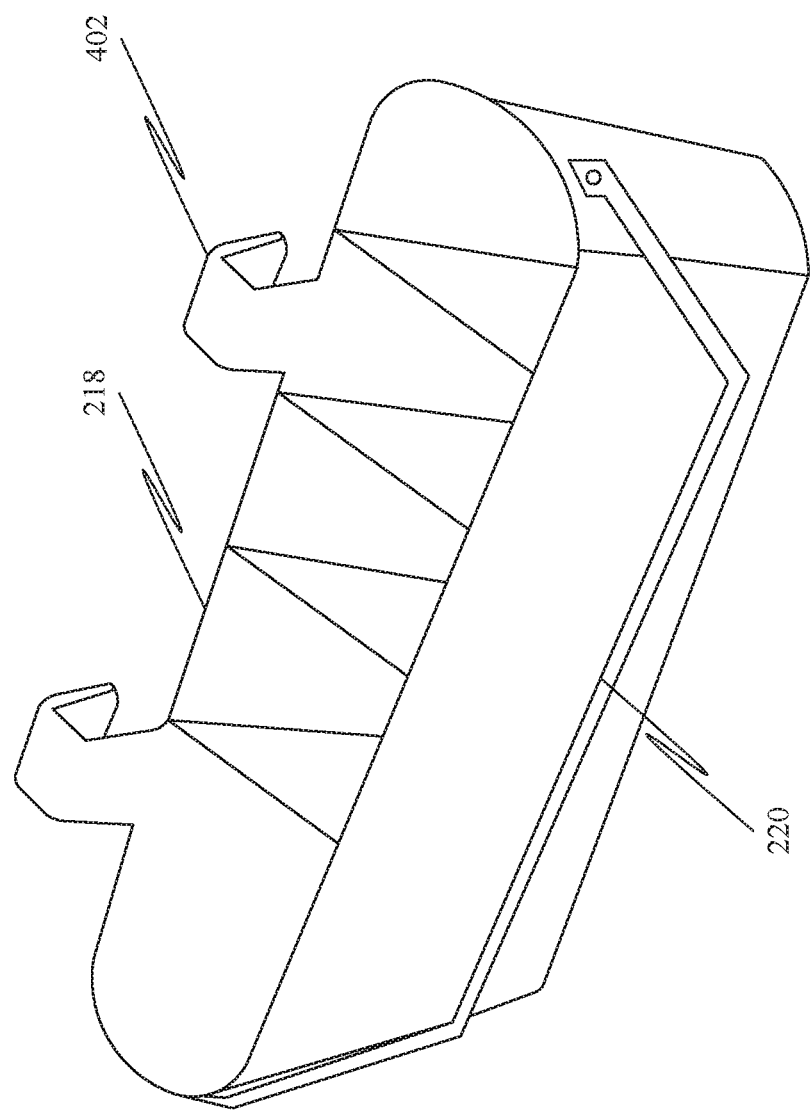

Further, the BetterCat litter box 300, in an instance, may include a removable BetterCat Organizer (such as the removable organizer 218). Further, as shown in FIG. 4, the removable BetterCat organizer, in an instance, may be a storage apparatus that may be configured to store a plurality of cleaning supplies in an organized form. Further, the plurality of cleaning supplies, in an instance, may include (but not limited to) one or more of scoopers (such as the scooper 222), litter waste bags (e.g. a bio-degradable litter bag), sprayers (such as sprayer 406, e.g. concentrated pet stain and odor remover spray), brushes (such as a brush 404), and/or absorbent pads 216 (e.g. the BetterPet-Pads) etc. Further, the removable BetterCat organizer may include multiple compartments that may allow the plurality of cleaning supplies to avoid any physical contact with each other. For instance, the scooper may be kept in a compartment different from the compartment that may store the litter waste bags. Further, the scooper, in an instance, may be any litter scooping apparatus with a deep shovel that may include a plurality of grooves. Further, the plurality of grooves of the scooper, in an instance, may allow the user to separate out clumps of urine and/or feces from the litter sand of the BetterCat litter box 300. Further, the plurality of grooves of the scooper, in an instance, may be configured to be long and narrow allowing the user to scoop out small sized clumps of urine and/or feces from the litter sand. Further, the removable BetterCat organizer, in an instance, may be configured to be attached and/or removed to and/or from the BetterCat litter box 300 through an attachment means (such as, but not limited to, hooks 402, Velcro fasteners, magnetic fasteners, and so on). For instance, the removable BetterCat organizer may include two (or more) hooks allowing the user to attach the removable BetterCat organizer at a top boundary of any of the four side surfaces of the BetterCat litter box 300. Further, the removable BetterCat organizer, in some embodiments, may include a holding handle (such as the holding handle 220 as shown in FIG. 2) that may be used to hold the removable BetterCat organizer in hand in order to remove/attach the removable BetterCat Organizer from/to the BetterCat litter box 300.

Figure 5:
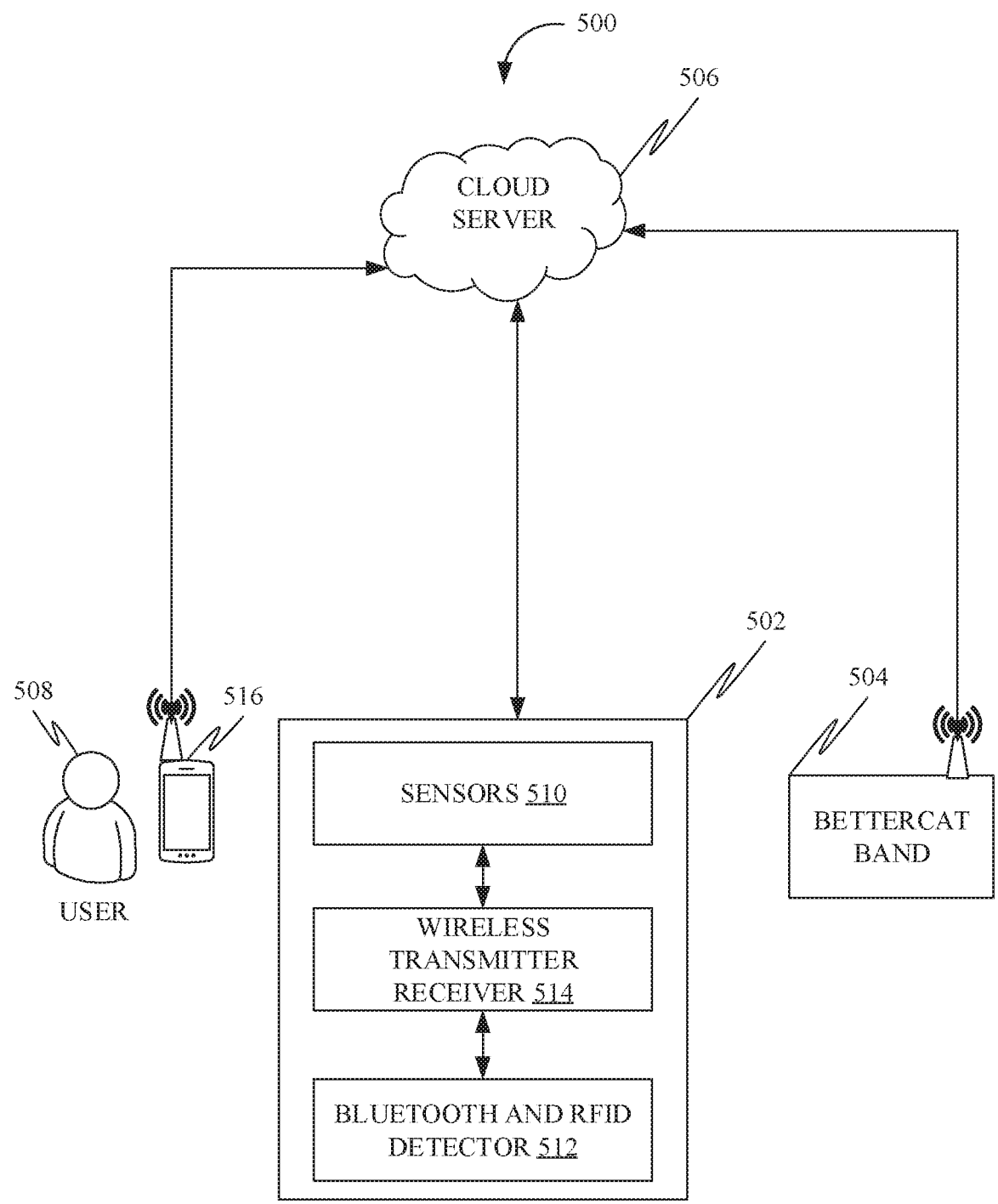
FIG. 5 shows a block diagram representation of a BetterCat litterbox system, in accordance with some embodiments.

FIG. 5 shows a block diagram representation of a BetterCat litterbox system 500, in accordance with some embodiments. Accordingly, the BetterCat litterbox system 500, in an instance, may be configured to facilitate maintaining a litter box 502 for pet animals. Further, the BetterCat litterbox system 500, in an instance, may include one or more of components such as (but not limited to) a litter box 502, a BetterCat band 504, a cloud server 506 etc.

Further, the litter box 502, in an instance, may sometimes be referred to as BetterCat litter box. Further, the litter box 502, in an instance, may be an IoT based rectangular litter box that may be configured to collect feces and/or urine from pet animals such as (but not limited to) cats, rabbits, ferrets, miniature pigs, small dogs, and/or other pets. Further, the litter box 502, in an instance, may be in a cuboid shape with six surfaces such as four side surfaces, one bottom surface, and one roof surface (i.e. a removable lid). Further, the bottom surface and all four side surfaces of the litter box 502, in an instance, may be solid and/or one piece with rounded edges and no seams and/or ridges. Further, the four side surfaces of the litter box 502, in an instance, may be designed with a tall height enabling large size pet animals (such as large cats) to comfortably move, turn and urinate inside the litter box 502. For instance, tall side surfaces of the litter box 502 may prevent any urine and/or feces to be sprayed outside the litter box 502 as large male cats may like to spray when urinate. Further, the roof surface, in an instance, may be a removable lid (such as the removable lid 210) which may be removed whenever required. For instance, the removable lid may be removed by a user (such as the user 508) from the litter box 502 while cleaning the litter box 502. Further, in another instance, the removable lid may be removed by the user from the litter box 502 in order to fill (and/or refill) the litter box 502 with litter sand up to a desired level. Further, the desired level associated with the litter sand for the litter box 502, in an instance, may be a depth level of the litter sand in the litter box such that when the cat urinates, the urine and/or feces may not touch the bottom surface of the litter box 502 and instead may form a hard clumping ball above the bottom surface which may be easily scooped out for cleaning.

Further, the litter box 502, in an instance, may be designed and/or manufactured from strong durable glossy plastic (one solid piece) with smooth inside surface (or shiny interior surface with no seams or ridges) allowing the user to clean the litter box 502 easily from the top (e.g. scooping and cleaning out cat litter). Further, the user, in an instance, may be a pet owner and/or a pet-sitter that may wish to clean the litter box 502. Further, the litter box 502, in an instance, may be light in color (such as, but not limited to, white or light beige) so that the user may be able to see the urine and/or feces for easy cleaning. Further, the litter box 502, in an instance, may include one or more handles on each side of the four side surfaces (near top boundaries) of the litter box 502. For instance, the litter box 502 may include four handles (in total) with one handle on each side surface of the litter box 502 such that the user may be able to tilt (using the handle) the litter box 502 to all the four sides for easy cleaning (e.g. scooping and cleaning out cat litter from all side directions).

Further, the litter box 502, in an instance, may be configured to provide enough room to accommodate one or more pet animals. For instance, the litter box 502 may be configured to accommodate small to extra-large cates easily (up to 20 pounds cats). Further, the litter box 502, in an instance, may include an entry/exit opening (such as the entry-exit opening 208) that may allow easy entry and/or exit for the pet animal (such as a cat). For instance, a regular cat may easily enter and/or exit the litter box 502 through the entry/exit opening having dimensions such as 10 inches (high) and 9 inches (wide). Further, the litter box 502, in an instance, may include a covered detachable holder (such as the detachable holder 214). Further, the covered detachable holder, in an instance, may be configured to hold a role of pet floor pads (such as the absorbent pads 216, which may be referred to as BetterPet-Pads) underneath and in front of the entry/exit opening of the litter box 502. Further, the BetterPet-Pads, in an instance, may be absorbent pads that may be rolled out from the covered detachable holder to cover a floor in-front of the entry/exit opening of the litter box 502. Further, the floor in-front of the entry/exit opening of the litter box 502, in an instance, may need to be covered with the BetterPet-Pads so that when the pet animal (such as a cat) may step outside the litter box 502 through the entry/exit opening, then an impurity (such as urine, feces etc.) may get absorbed by the BetterPet-pads instead of spilling over the floor. Further, the BetterPet-Pads, in an instance, may be perforated so that the user may tear them off as used. For instance, the user may simply pull out a pad from the roll of pet floor pads of the covered detachable holder, and tear the pad off when a new one may be needed. Further, the BetterPet-Pads, in an instance, may be lightweight and may allow the user to throw litter sand back in the litter box 502. For instance, if a cat spills the litter sand outside the litter box 502, then the litter sand may be collected over the BetterPet-Pads that may further be thrown back into the litter box 502. Further, in a case when the cat urinates over the BetterPet-Pads, the BetterPet-Pads may not need to be washed and/or soaped with water in order to get the smell out. In an instance, the BetterPet-Pads may include perforated cat pads (also known as puppy training pads). Further, a top of the covered detachable holder, in an instance, may be made up of strong plastic and may serve as a stepping area for the pet animals to get in and out of the litter box 502 through the entry/exit opening that may be placed at a significant height. Further, the higher the entry/exit opening of the litter box, the less chance of urine ending up outside of the litter box.

Further, the litter box 502, in an instance, may include a removable BetterCat Organizer (such as the removable organizer 218). Further, the removable BetterCat organizer, in an instance, may be a storage apparatus that may be configured to store a plurality of cleaning supplies in an organized form. Further, the plurality of cleaning supplies, in an instance, may include (but not limited to) one or more of scoopers (such as the scooper 222), litter waste bags (e.g. a bio-degradable litter bag), sprayers (such as sprayer 406, as shown in FIG. 4, e.g. concentrated pet stain and odor remover spray), brushes (such as brush 404 as shown in FIG. 4), and/or absorbent pads 216 (e.g. the BetterPet-Pads) etc. Further, the removable BetterCat organizer may include multiple compartments that may allow the plurality of cleaning supplies to avoid any physical contact with each other. For instance, the scooper may be kept in a compartment different from the compartment that may store the litter waste bags. Further, the scooper (such as the scooper 222), in an instance, may be any litter scooping apparatus with a deep shovel that may include a plurality of grooves. Further, the plurality of grooves of the scooper, in an instance, may allow the user to separate out clumps of urine and/or feces from the litter sand of the litter box 502. Further, the plurality of grooves of the scooper, in an instance, may be configured to be long and narrow allowing the user to scoop out small sized clumps of urine and/or feces from the litter sand. Further, the removable BetterCat organizer, in an instance, may be configured to be attached and/or removed to and/or from the litter box 502 through an attachment means such as, but not limited to, hooks 402 (as shown in FIG. 4), Velcro fasteners, magnetic fasteners, and so on. For instance, the removable BetterCat organizer may include two (or more) hooks allowing the user to attach the removable BetterCat organizer at a top boundary of any of the four side surfaces of the litter box 502. Further, the removable BetterCat organizer, in some embodiments, may include a holding handle (such as the at least one holding handle 220 as shown in FIG. 2) that may be used to hold the removable BetterCat organizer in hand in order to remove/attach the removable BetterCat Organizer from/to the litter box 502.

Further, the litter box 502 may include a one or more of sensors 510, Bluetooth and/or RFID detectors 512, wireless transmitter receivers 514 etc. Further, the one or more sensors 510, in an instance, may be sensor devices that may be embedded within the litter box 502. Further, the one or more sensors 510, in an instance, may be configured to convert any physical quantity (such as, but not limited to, motion, temperature, odor level etc.) into an electrical signal (and/or may be referred to as sensor data) for further processing. Further, the one or more sensors 510, in an instance, may include sensors such as (but not limited to) motion sensors, temperature sensors, ultrasonic sensors, camera sensors, light sensors, weight sensors, pressure sensors, odor sensors (such as ammonia sensors), audio sensors (such as microphones) etc. Further, the sensor data from the one or more sensors 510, in an instance, may be transmitted to the cloud server 506 of the BetterCat litterbox system 500 through the wireless transmitter and receiver 514. Further, the wireless transmitter and receiver 514, in an instance, may be configured to transmit the sensor data over, but not limited to, a Wi-Fi, a Bluetooth, an electromagnetic waveform, ultra-sound, cellular (5G) and/or an Infra-red etc. Further, the litter box 502, in an instance, may include Bluetooth and/or RFID detectors 512 that may be configured to scan and/or detect the BetterCat band 504 worn by the pet animal (such as a cat). Further, the BetterCat band 504, in an instance, may be an RFID based band/collar that may be scanned by the Bluetooth and/or RFID detector 512 of the litter box 502 in order to determine an identity associated with the pet animal. For instance, the BetterCat band 504 may be scanned by the Bluetooth and/or RFID detector 512 of the litter box 502 in order to identify and/or determine which cat of a plurality of cats may have entered/exited the litter box 502. Further, in some embodiments, the BetterCat band 504 may be a Bluetooth based band/collar that may be scanned by a Bluetooth detector of the litter box 502. Further, in some embodiments, the BetterCat band 504 may include sensors such as (but not limited to) GPS sensors, camera sensors, microphones, position sensors, temperature sensors etc. allowing the user to maintain surveillance over the pet animal (such as the cat). Further, in some embodiments, the BetterCat band 504 may be configured to track location associated with the cat (by using the GPS sensors). Further, the BetterCat band 504 may be configured to track sleep patterns associated with the cat (such as by using the accelerometer, and/or the audio sensors etc.).

Further, the cloud server 506, in an instance, may be an online platform (such as the online platform 100) that may be configured to process and/or analyze any data (such as the sensor data) received from one or more sensors 510 of the litter box 502, BetterCat band 504, and/or user devices 516 associated with the users 508. Further, the user device 516, in an instance, may any IoT based device that may allow the user 508 to communicate with the cloud server 506. Further, the user device 516, in an instance, may include devices such as (but not limited to) a smartphone, a smartwatch, a PC, a laptop etc. Further, the user 508, in an instance, may register themselves on the cloud server 506 by providing details (such as, but not limited to, personal details, shipping and billing details, pet names and details, account password or security details etc.) through a software application (that may be referred to as BetterCat application) by interacting with the user device 516. The BetterCat application, in an instance, may provide an interface to the user 508 in order to communicate with the cloud server 506 (and/or the litter box). For instance, the BetterCat application may allow the user 508 to monitor how often the cat comes into the litter box 502. Further, in another instance, the BetterCat application may notify the user 508 to clean the litter box 502 based on a notification data generated by the cloud server 506.

Further, the cloud server 506, in an instance, may be configured to generate notification data based on the sensor data received from the litter box 502. Further, the cloud server 506, in an instance, may be configured to transmit notification data to the (one or more) user devices 516 associated with the user 508. Further, the notification data, in an instance, may include any data that may be of something of interest to the user 508 with regard to maintaining the litter box 502. For instance, the notification data may include one or more alert notifications that may convey a message to the user 508 to clean the litter box 502. Further, in another instance, the notification data may include insights that may provide pet-care instructions with texts, photos and videos to the user 508 (such as a pet-sitter).

Further, the one or more of sensors 510, in an instance, may include a motion sensor configured to detect (e.g. number of) entry and/or exit events of the pet animal into and/or from the entry/exit opening of the litter box 502. In an instance, the motion sensor may be embedded near surrounding of the entry/exit opening of the litter box 502. Further, a sensor data sensed by the motion sensor, in an instance, may be transmitted to the cloud server 506 through the wireless transmitter and receiver 514 of the litter box 502. Further, the sensor data sensed by the motion sensor, in an instance, may be analyzed by the cloud server 506 in order to determine if the litter box 502 may need cleaning or not. For instance, if the pet animal (such as the cat) may have entered/exited the litter box 502 beyond a threshold number (such as 5 times, 6 times), then the litter box 502 may need to be cleaned by the user 508. Further, in the aforementioned instance, the cloud server 506 may be configured to transmit the notification data to the user device 516 associated with the user 508 that may convey a message to the user 508 to clean the litter box 502. Further, the threshold number, in an instance, may be set by the user 508 by interacting with the user device 516 through the BetterCat application.

Further, the one or more sensors 510 (such as proximity sensors, and/or motions sensors), in an instance, may also be located at the removable lid of the litter box 502 in order to determine timing and frequency of cleaning of the litter box 502 by the user (from the top of the litter box 502). For instance, the motion sensors embedded in the removable lid may be configured to trigger a signal to the cloud server 506 whenever the removable lid may be removed and/or attached from/to the litter box 502 allowing the cloud server 506 to maintain a record on when (and/or how many times) the litter box 502 is cleaned by the user. Further, in some embodiments, the motion sensors may be embedded on four side surfaces of the litter box 502 in order to determine a timing and/or frequency of cleaning of the litterbox by the user (when the litter box 502 may be tilted by the user for cleaning). For instance, the motion sensors embedded in the four side surfaces of the litter box 502 may be configured to trigger a signal to the cloud server 506 whenever the litter box 502 may be tilted in multiple directions by the user allowing the cloud server 506 to maintain a record on when (and/or how many times) the litter box 502 is cleaned by the user.

Further, in some embodiments, the one or more sensors 510 may include weight sensors that may be embedded within the stepping area and/or the bottom surface of the litter box 502 in order to detect (e.g. number of) entry and/or exit events of the pet animal into and/or from the entry/exit opening of the litter box 502. Further, the weight sensors, in an instance, may be configured to sense a weight associated with the pet animal (such as the cat) whenever the pet animal enters the litter box 502. Further, the sensor data sensed by the weight sensor, in an instance, may be transmitted to the cloud server 506 through the wireless transmitter and receiver 514 of the litter box 502. Further, the sensor data sensed by the weight sensor, in an instance, may be analyzed by the cloud server 506 in order to determine if the litter box 502 may need cleaning or not (and/or if the litter box 502 may be currently occupied by the cat or not). For instance, if the pet animal (such as the cat) may have entered/exited the litter box 502 beyond a threshold number (such as 5 times, 6 times), then the litter box 502 may need to be cleaned by the user. Further, in the aforementioned instance, the cloud server 506 may be configured to transmit the notification data to the user device 516 associated with the user that may convey a message to the user 508 to clean the litter box 502. Further, the threshold number, in an instance, may be set by the user 508 by interacting with the user device 516 through the BetterCat application.

Further, in some embodiments, the one or more sensors 510 may include odor sensors (such as an ammonia sensor) that may be configured to sense an odor level associated with the litter box 502. Further, the ammonia sensor, in an instance, may be disposed within an interior of the litter box 502. Further, a sensor data sensed by the ammonia sensor, in an instance, may be transmitted to the cloud server 506 through the wireless transmitter and receiver 514 of the litter box 502. Further, the sensor data sensed by the ammonia sensor, in an instance, may be analyzed by the cloud server 506 in order to determine if the litter box 502 may need cleaning or not. For instance, if the odor level associated with the litter box 502 is above a certain threshold odor level, then the litter box 502 may need to be cleaned by the user. Further, in such cases, the cloud server 506 may be configured to transmit the notification data to the user device 516 associated with the user that may convey a message to the user device 516 clean the litter. Further, the threshold odor level, in an instance, may be set by the user by interacting with the user device 516 through the BetterCat application. Further, in some embodiments, the litter box 502 may include a one or more fragrance dispensers (such as concentrated pet stain and odor remover) that may be configured to spray fragrances in order to reduce the odor level in the litter box 502. Accordingly, the cloud server 506, in an instance, may be configured to transmit an actuating signal to the litter box 502 based on the odor level. Further, the actuating signal transmitted by the cloud server 506 to the litter box 502, in an instance, may be an electrical signal that may be configured to operate the one or more fragrance dispensers disposed in the litter box 502 to create a pleasant aroma around the litter box 502 for pet animals and/or humans present nearby.

Further, in some embodiments, the one or more sensors 510 may include ultrasonic sensors that may be configured to sense a depth associated with the depth level of the litter sand that may be available in the litter box 502. Further, the ultrasonic sensor, in an instance, may be embedded in the removable lid of the litter box 502. Further, a sensor data sensed by the ultrasonic sensor, in an instance, may be transmitted to the cloud server 506 through the wireless transmitter and receiver 514 of the litter box 502. Further, the sensor data sensed by the ultrasonic sensor, in an instance, may be analyzed by the cloud server 506 in order to determine if more litter sand may need to be added in the litter box 502 or not. For instance, if the depth level of litter sand is below a certain threshold level, then more litter sand may need to be added in the litter box 502. Further, in such cases, the cloud server 506 may be configured to transmit the notification data to the user device 516 associated with the user that may convey a message to the user to add more litter sand into the litter box 502. Further, the threshold level, in an instance, may be set by the user by interacting with the user device 516 through the BetterCat application.

Further, in some embodiments, the one or more sensors 510 may include location sensors that may allow the user to detect a location associated with the litter box 502 by interacting with the user device 516 through the BetterCat application. For instance, for a user with multiple pet animals, multiple litter boxes may be placed at different locations. Therefore, the user may be able to track which litter box 502, in an instance, may be used by which pet animal at any instant of time. Further, in some embodiments, the one or more sensors 510 may include camera sensors that may be configured to provide audiovisual data associated with the litter box 502 to the user (through the BetterCat application) for surveillance.

Further, in some embodiments, the BetterCat application may include two versions (namely a basic version and an upgraded version). Further, the basic version of the BetterCat application, in an instance, may include a customer account module. Further, the customer account module, in an instance, may include data such as (but not limited to) Customer personal Details, Shipping and billing details, Pet names and details, Account password and security, Litterbox connect, setup and location, Communication and sharing channel setup (such as text, email, WhatsApp etc.). Further, the basic version of the BetterCat application may allow the user 508 to monitor how often the cat comes into the litter box 502. Further, in an instance, the BetterCat application may notify the user 508 to clean the litter box 502 based on the notification data generated by the cloud server 506. Further, the basic version of the BetterCat application, in an instance, may allow the user 508 to customize when and/or how the user 508 to be notified for the cleaning. Further, the basic version of the BetterCat application, in an instance, may allow the user 508 to auto schedule any purchase associated with BetterCat-care products. For instance, the user 508 may be allowed to order the litter sand, the plurality of cleaning supplies, animal foods etc. from the BetterCat application with auto-delivery scheduling. Further, in another instance, the basic version of the BetterCat application may allow the cloud server 506 to connect with other applications through Application Programming Interface (API) so that the user 508 may integrate complementary services such as to link to pet-sitter services (e.g. finding a pet-sitter) via API.

Further, the upgraded version of the BetterCat application, in an instance, may include features in addition to the features of the basic version of the BetterCat application. For instance, tracking the cat in the house or outside via Bluetooth, analytics (and/or insights) such as how many times the litter box 502 may be used by the cat in a day, and or which litter box 502 may be used by which cat, cat locations, customer analytics etc. Further, the upgraded version of the BetterCat application, in an instance, may provide pet-care instructions with texts, photos and video (made with application or uploaded to the application) to pet-sitters. Pet-care instructions, in an instance, may be shared via text, email, WhatsApp etc. Further, the upgraded version of the BetterCat application, in an instance, may include a Pet-sitter module. Further, the pet-sitter module, in an instance, may allow the user 508 to add a sitter as a guest and have care start date and time and end date and time (with security). Further, the upgraded version of the BetterCat application, in an instance, may allow the user 508 to upload details associated with the cat (such as cat medications, food types etc.) and servicing procedures that may be shared with the pet-sitter.

FIG. 6 is an exploded perspective view of a pet care system 600 configured to provide shelter to one or more pet animals, in accordance with some embodiments. Accordingly, the pet care system 600 may include a cuboid-shaped housing having a substantially rectangular base 602, a removable lid 604, and four vertical side walls 606. Further, the rectangular base 602 may be having the four side edges. Further, each side edge in the four side edges of the rectangular base 602 may be attached to at least one bottom edge of the four vertical side walls 606, wherein the rectangular base 602 and the four vertical side walls 606 of the cuboid-shaped housing form a one-piece enclosure configured to accommodate the one or more pet animals. Further, the removable lid 604 may be configured to be removably attached to top edges of the four vertical side walls 606. Further, at least one vertical side wall in the four vertical side walls 606 may include an entry-exit opening 608 for the one or more pet animals.

Further, the pet care system 600 may include a detachable holder 610 configured to be detachably placed on an outer surface of the at least one vertical side wall below the entry-exit opening 608. Further, the detachable holder 610 may be configured to hold at least one roll of absorbent pad. Further, in some embodiments, the detachable holder 610 may be configured to be detachably placed with a stepping section 622. Further, the stepping section 622, in an instance, may function as a stepping area for the one or more pet animals to facilitate easy entry and exit events through the entry-exit opening 608.

Further, the pet care system 600 may include a removable organizer 612 configured to store a plurality of cleaning supplies (such as a scooper 614). Further, the removable organizer 612 may be removably attached to a top edge of at least one vertical side wall in the four vertical side walls 606 through an attachment means (such as a hook 616).

Further, in some embodiments, the at least one vertical side wall of the cuboid-shaped housing may include at least one handle (such as handle 618) near the at least one top edge of the at least one vertical side wall.

Further, in some embodiments, the pet care system 600 may include at least one rubber grip 620 configured to be attached at a bottom surface of the rectangular base 602. Further, the at least one rubber grip 620, in an instance, may provide grip for the cuboid-shaped housing to avoid any unnecessary movement due to any entry/exit event of the one or more pet animals.

Further, in some embodiments, the pet care system 600 may include at least one sensor device attached to at least one portion of at least one of the cuboid-shaped housing, the detachable holder 610, and the removable organizer 612. Further, the at least one sensor device may be configured to generate at least one sensor data.

Further, in some embodiments, the pet care system 600 may include a wireless transceiver attached to at least one portion of at least one of the cuboid-shaped housing, the detachable holder 610, and the removable organizer 612. Further, the wireless transceiver may be communicatively coupled with the at least one sensor device. Further, the wireless transceiver may be configured to transmit an alert notification to at least one user device based on the at least one sensor data.

Figure 7:
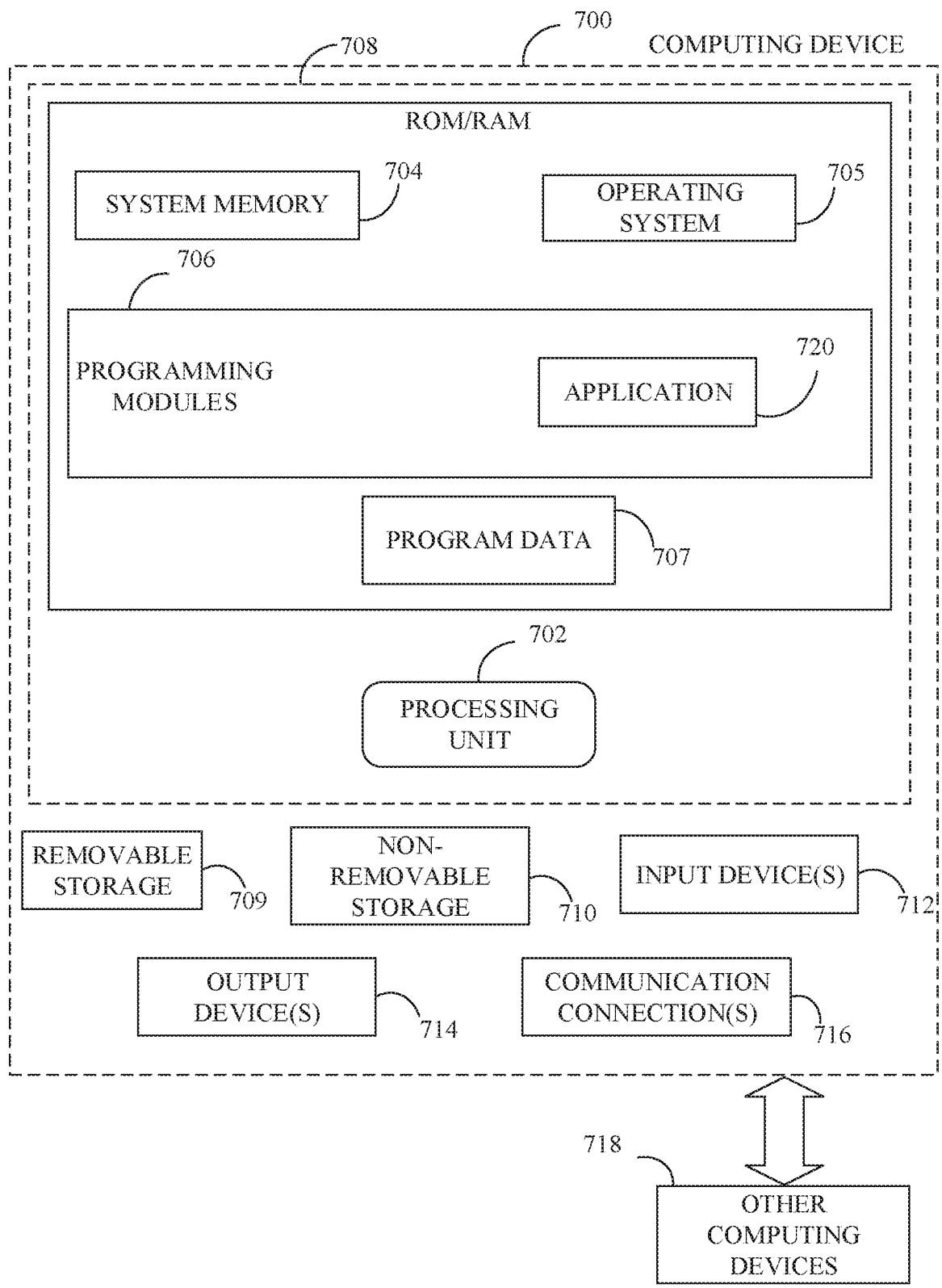
FIG. 7 is a block diagram of a computing device for implementing the methods disclosed herein, in accordance with some embodiments.

With reference to FIG. 7, a system consistent with an embodiment of the disclosure may include a computing device or cloud service, such as computing device 700. In a basic configuration, computing device 700 may include at least one processing unit 702 and a system memory 704. Depending on the configuration and type of computing device, system memory 704 may comprise, but is not limited to, volatile (e.g. random-access memory (RAM)), non-volatile (e.g. read-only memory (ROM)), flash memory, or any combination. System memory 704 may include operating system 705, one or more programming modules 706, and may include a program data 707. Operating system 705, for example, may be suitable for controlling computing device 700's operation. In one embodiment, programming modules 706 may include image-processing module, machine learning module. Furthermore, embodiments of the disclosure may be practiced in conjunction with a graphics library, other operating systems, or any other application program and is not limited to any particular application or system. This basic configuration is illustrated in FIG. 7 by those components within a dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and non-volatile, removable and non-removable media implemented in any method or technology for storage of information, such as computer-readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a keyboard, a mouse, a pen, a sound input device, a touch input device, a location sensor, a camera, a biometric sensor, etc. Output device(s) 714 such as a display, speakers, a printer, etc. may also be included. The aforementioned devices are examples and others may be used.

Computing device 700 may also contain a communication connection 716 that may allow device 700 to communicate with other computing devices 718, such as over a network in a distributed computing environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 704, including operating system 705. While executing on processing unit 702, programming modules 706 (e.g., application 720 such as a media player) may perform processes including, for example, one or more stages of methods, algorithms, systems, applications, servers, databases as described above. The aforementioned process is an example, and processing unit 702 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A pet care system configured to provide shelter to one or more pet animals, wherein the pet care system comprises:
a housing having a base and at least one vertical side wall, wherein at least one side edge of the base is attached to at least one bottom edge of the at least one vertical side wall, wherein the base and the at least one vertical side wall of the housing form a one-piece enclosure configured to accommodate the one or more pet animals, wherein an inner surface of the one-piece enclosure is a smooth surface comprising rounded edges, wherein the at least one vertical side wall comprises an entry-exit opening for the one or more pet animals;
a removable lid configured to be removably attached to at least one top edge of the at least one vertical side wall;
a detachable holder configured to be detachably placed on an outer surface of the at least one vertical side wall, wherein the detachable holder is configured to hold at least one absorbent pad, wherein the detachable holder is configured to be detachably placed below the entry-exit opening, wherein the detachable holder is configured to function as a stepping area for the one or more pet animals;
a removable organizer configured to store a plurality of cleaning supplies, wherein the removable organizer is removably attached to the at least one vertical side wall through an attachment means;
at least one sensor device attached to at least one portion of at least one of the housing, the detachable holder, the removable lid, and the removable organizer, wherein the at least one sensor device is configured to generate at least one sensor data, wherein the at least one sensor device comprises a motion sensor, wherein the motion sensor is configured to detect entry and exit events of the one or more pet animals through the entry-exit opening; and
a wireless transceiver attached to at least one portion of at least one of the housing, the detachable holder, the removable lid, and the removable organizer, wherein the wireless transceiver is communicatively coupled with the at least one sensor device, wherein the wireless transceiver is configured to transmit an alert notification to at least one user device based on the at least one sensor data, wherein the alert notification is transmitted based on a number of entry events exceeding a threshold number set by a user.

2. The pet care system of claim 1, wherein the motion sensor is embedded on the at least one vertical side wall near the entry-exit opening of the housing.

3. The pet care system of claim 1, wherein the at least one sensor device comprises a Bluetooth and Radio-Frequency Identification (RFID) detector configured to scan a band associated with a pet animal to determine an identity of a pet animal in the one or more pet animals, wherein the band comprises at least one of a Bluetooth based collar and an RFID based collar worn by the pet animal.

4. The pet care system of claim 3, wherein the Bluetooth and RFID detector is embedded on the at least one vertical side wall near the entry-exit opening of the housing.

5. The pet care system of claim 1, wherein the at least one sensor device comprises a proximity sensor configured to detect opening and closing events of the removable lid.

6. The pet care system of claim 5, wherein the proximity sensor is embedded on at least one of the removable lid, and the at least one vertical side wall of the housing.

7. The pet care system of claim 1, wherein the detachable holder is configured to be detachably placed on the outer surface of the at least one vertical side wall below the entry-exit opening, wherein the detachable holder functions as a stepping area for the one or more pet animals.

8. The pet care system of claim 1, wherein the detachable holder is further configured to hold a roll of pet floor pad, wherein the roll of pet floor pad is configured to be rolled out from the detachable holder.

9. The pet care system of claim 1, wherein the attachment means comprises at least one of hooks, Velcro fasteners, and magnetic fasteners.

10. The pet care system of claim 1, wherein the removable organizer comprises a plurality of compartments.

11. The pet care system of claim 1, wherein the removable organizer comprises at least one holding handle.

12. The pet care system of claim 1, wherein the removable organizer is further configured to store at least two cleaning supplies selected from the group comprising of scoopers, litter waste bags, sprayers, brushes, and absorbent pads.

13. The pet care system of claim 1, wherein the at least one vertical side wall of the housing comprises at least one handle near a top edge of the at least one vertical side wall.

14. The pet care system of claim 1, wherein the alert notification comprises at least one of an email, an SMS, a voice call, a voicemail, and an audible alert, wherein the alert notification is in at least one of a textual form, an audio form, and an audiovisual form.

15. The pet care system of claim 1, wherein the alert notification comprises a prompt to clean the housing of the pet care system.

16. The pet care system of claim 1, wherein the alert notification comprises behavior analytics associated with the one or more pet animals.

17. A pet care system configured to provide shelter to one or more pet animals, wherein the pet care system comprises:
- a housing having a base and at least one vertical side wall, wherein at least one side edge of the base is attached to at least one bottom edge of the at least one vertical side wall, wherein the base and the at least one vertical side wall of the housing form a one-piece enclosure configured to accommodate the one or more pet animals, wherein an inner surface of the one-piece enclosure is a smooth surface comprising rounded edges, wherein the at least one vertical side wall comprises an entry-exit opening for the one or more pet animals;
- a removable lid configured to be removably attached to at least one top edge of the at least one vertical side wall;
- a detachable holder configured to be detachably placed on an outer surface of the at least one vertical side wall, wherein the detachable holder is configured to hold at least one absorbent pad, wherein the detachable holder is configured to be detachably placed below the entry-exit opening, wherein the detachable holder is configured to function as a stepping area for the one or more pet animals; and
- a removable organizer configured to store a plurality of cleaning supplies, wherein the removable organizer is removably attached to the at least one vertical side wall through an attachment means;
- at least one sensor device attached to at least one portion of at least one of the housing, the detachable holder, the removable lid, and the removable organizer, wherein the at least one sensor device is configured to generate at least one sensor data, wherein the at least one sensor device comprises a motion sensor, wherein the motion sensor is configured to detect entry and exit events of the one or more pet animals through the entry-exit opening, wherein the at least one sensor further comprises a weight sensor configured to sense a weight associated with the one or more pet animals, wherein the weight is associated with an identity of the one or more pet animals; and
- a wireless transceiver attached to at least one portion of at least one of the housing, the detachable holder, the removable lid, and the removable organizer, wherein the wireless transceiver is communicatively coupled with the at least one sensor device, wherein the wireless transceiver is configured to transmit an alert notification to at least one user device based based on the at least one sensor data, wherein the alert notification is transmitted based on a number of entry events exceeding a threshold number set by a user.

* * * * *